United States Patent [19]
Marik et al.

[11] Patent Number: 5,464,342
[45] Date of Patent: Nov. 7, 1995

[54] PIN IN BARREL INJECTION MOLDING NOZZLE USING SHORT PIN

[75] Inventors: Wayne Marik, Mantua; John Begalla, Chardon; Tom W. Johnnson, Hunting Valley, all of Ohio

[73] Assignee: Nitrojection Corporation, Chagrin Falls, Ohio

[21] Appl. No.: 126,323

[22] Filed: Sep. 24, 1993

[51] Int. Cl.$^6$ ............................ B29C 44/42; B29C 45/23
[52] U.S. Cl. .................... 425/533; 264/328.12; 264/572; 425/546; 425/564
[58] Field of Search ...................................... 425/546, 130, 425/533, 560, 564; 264/572, 328.12, 328.13

[56] References Cited

U.S. PATENT DOCUMENTS

| | | | |
|---|---|---|---|
| 2,940,123 | 6/1960 | Beck et al. | 425/170 |
| 4,474,717 | 10/1984 | Hendry | 264/45.5 |
| 4,657,496 | 4/1987 | Ozeki et al. | 425/130 |
| 4,905,901 | 3/1990 | Johnson | 239/135 |
| 4,990,083 | 2/1991 | Bernhardt | 425/547 |
| 5,030,076 | 7/1991 | Ebenhofer | 425/130 |
| 5,054,689 | 10/1991 | Hunerberg et al. | 239/412 |
| 5,151,278 | 9/1992 | Baxi et al. | 425/130 |
| 5,164,200 | 11/1992 | Johnson | 425/130 |
| 5,208,046 | 5/1993 | Shah et al. | 425/130 |

*Primary Examiner*—Jay H. Woo
*Assistant Examiner*—Joseph Leyson
*Attorney, Agent, or Firm*—Fay, Sharpe, Beall, Fagan, Minnich & McKee

[57] ABSTRACT

An apparatus for injecting a viscous fluid and a non-viscous fluid into a mold cavity of a mold body includes a nozzle body having a discharge end a flow passage for the viscous fluid extending to the discharge end. A valve element is mounted for reciprocation in the nozzle body flow passage to control the flow of the viscous fluid through the nozzle body discharge end. The valve element includes a barrel having a first end and a second end and a first bore extending longitudinally in the barrel. A tip is detachably secured to the barrel first end for selectively engaging a portion of the nozzle body discharge end to prevent a flow of the viscous fluid therepast. The tip has a first end, a second end and a second bore extending longitudinally through the tip from the first end to the second end. A pin is located in the second bore. The pin has a first end located adjacent the tip first end, such that the pin and the tip define between them an annular opening at the tip first end. The annular opening communicates with the barrel bore. The pin also has an enlarged diameter section which is selectively securable between the tip and the barrel. The pin can be removed from the barrel when the tip is detached from the barrel.

19 Claims, 3 Drawing Sheets

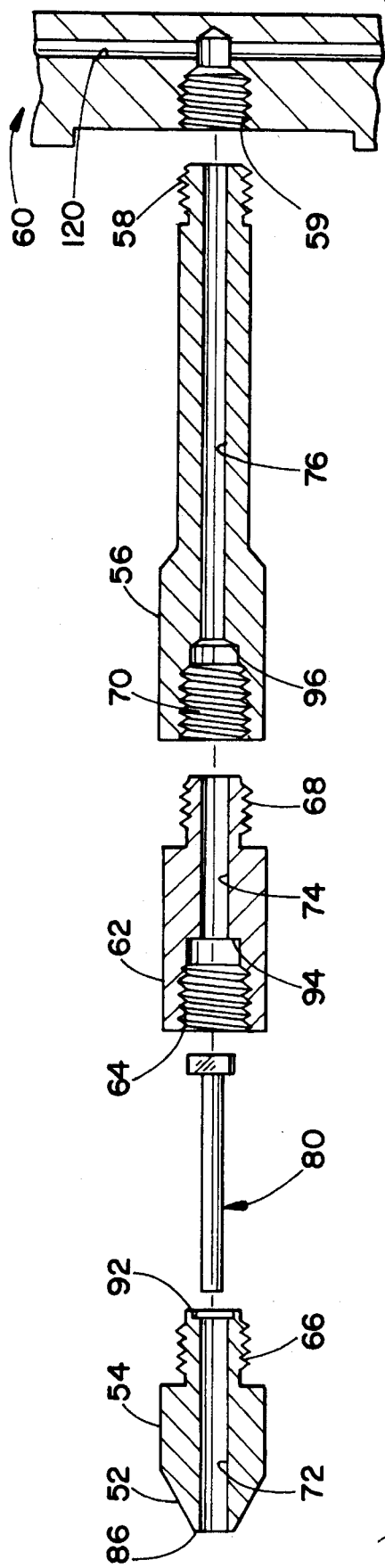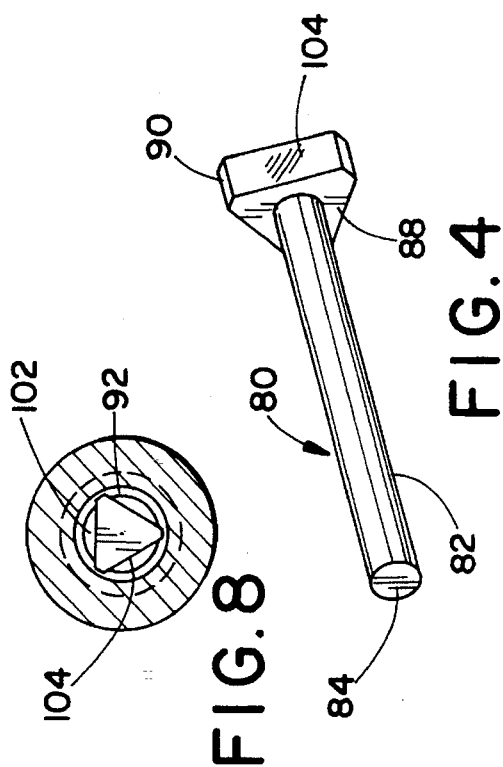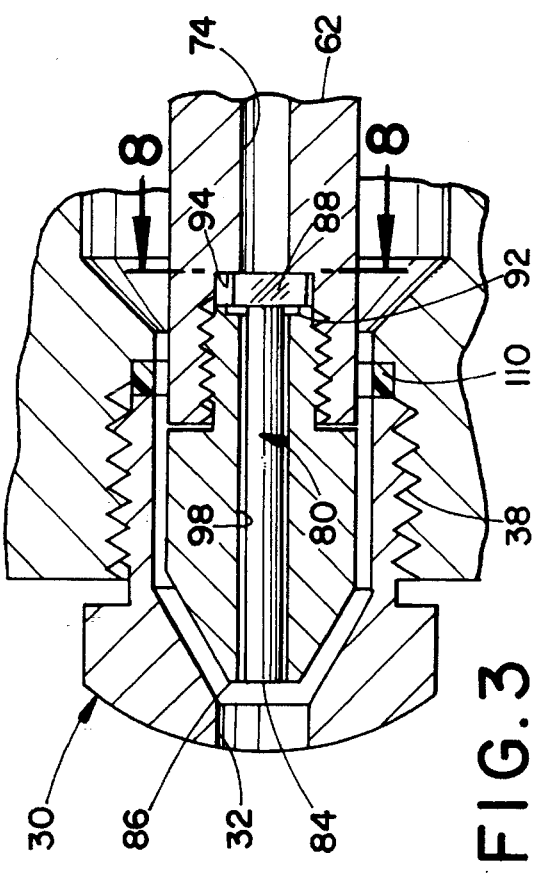

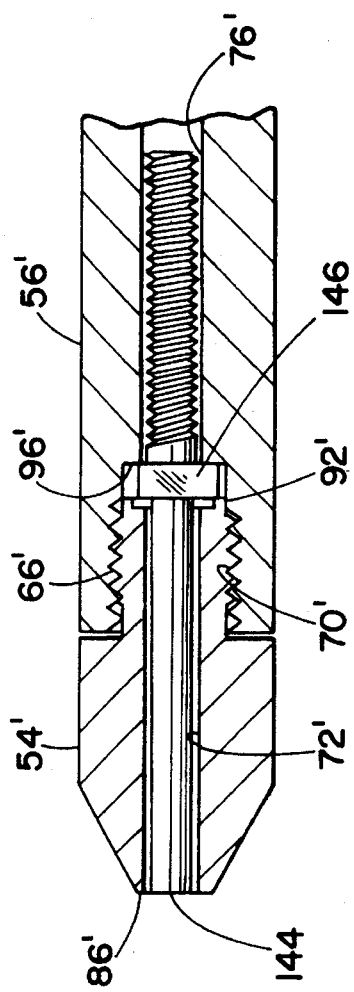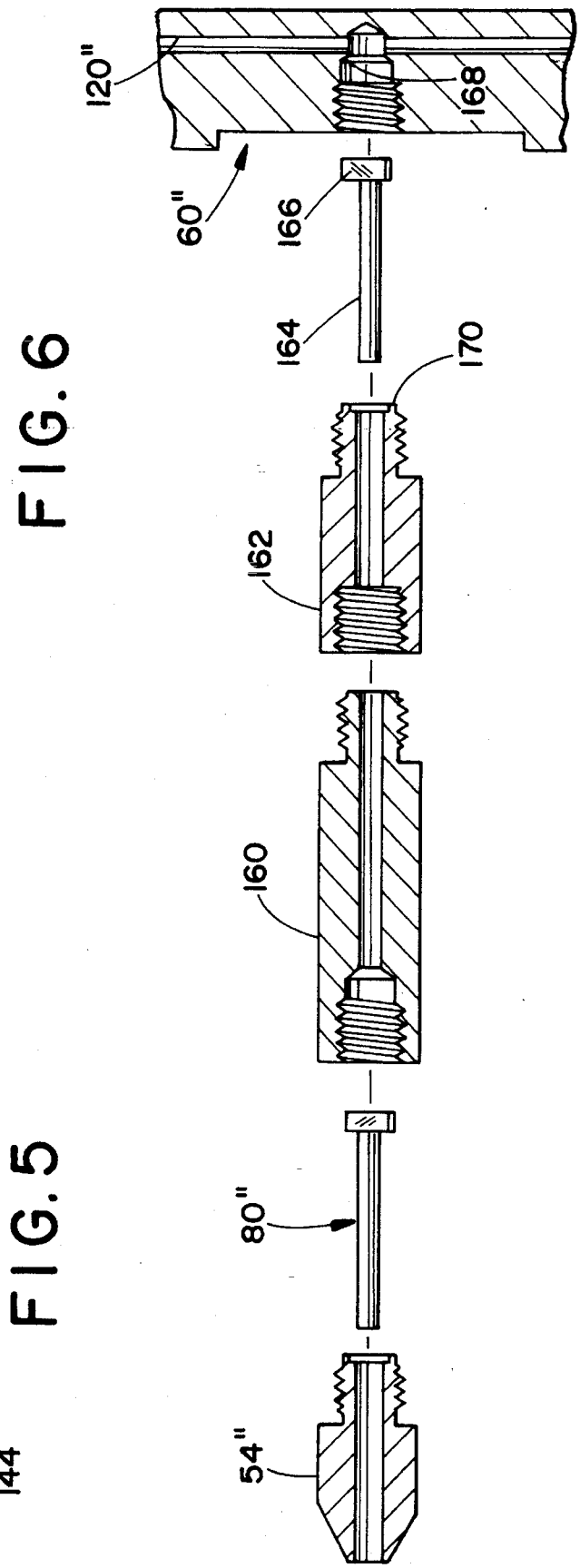

PIN IN BARREL INJECTION MOLDING NOZZLE USING SHORT PIN

BACKGROUND OF THE INVENTION

This invention generally pertains to nozzles for injection molding. More specifically, the present invention relates to a nozzle for the fluid-assisted injection molding of plastic materials.

Such nozzles are illustrated in U.S. Pat. Nos. 4,905,901 dated Mar. 6, 1990; 5,151,278 dated Sep. 29, 1992 and 5,164,200 dated Nov. 17, 1992. These three patents are owned by the assignee of the instant application. The disclosures of these three patents are incorporated herein by reference in their entireties.

Several recently perfected nozzles do away with many of the disadvantages of employing gas assisted injection molding. In these nozzles, a pin is located in a longitudinally extending bore of a barrel of the nozzle. In the embodiment disclosed in the U.S. Pat. No. 5,151,278, the pin remains stationary as the barrel of the nozzle reciprocates in relation to the pin. In the embodiments disclosed in the U.S. Pat. No. 5,164,200 and the U.S. Pat. No. 4,905,901, the pin and the barrel reciprocate together since the pin is operatively secured to the barrel. In each of these designs, however, a relatively long pin is employed which may be on the order of 15 inches. Such a pin is difficult and expensive to manufacture. In addition, a barrel with such a long pin in the barrel bore is difficult to clean and maintain should it become necessary to remove plastic material which may have flowed into the annular passage formed between the pin and the inner periphery of the barrel, around the bore.

Accordingly, it has been considered desirable to develop a new and improved gas assisted injection molding nozzle which would overcome the foregoing difficulties and others while providing better and more advantageous overall results.

BRIEF SUMMARY OF THE INVENTION

According to the present invention, an apparatus for injecting a viscous fluid and a non-viscous fluid into a mold cavity of a mold body is provided.

More particularly, in accordance with this aspect of the invention, the apparatus comprises a nozzle body having a discharge end and a flow passage for the viscous fluid extending to the discharge end. A valve element is mounted for reciprocation in the nozzle body flow passage to control a flow of the viscous fluid through the nozzle body discharge end. The valve element comprises a barrel having a first end and a second end and a first bore extending longitudinally in the barrel. A tip is detachably secured to the barrel first end for selectively engaging a portion of the nozzle body discharge end to prevent a flow of the viscous fluid therepast. The tip has a first end, a second end and a second bore extending longitudinally through the tip from the first end to the second end thereof. The first and second bores communicate with each other. A pin is located in the second bore. The pin has a first end located adjacent the tip first end such that the pin and the tip define between them an annular opening at the tip first end. The pin has an enlarged diameter section which is selectively securable between the tip and the barrel and can be detached therefrom when the tip is detached from the barrel.

The pin can have a substantially cylindrical periphery extending from the first end to adjacent the enlarged diameter section. If desired, the enlarged diameter section can have a substantially triangular shape. Also, if desired, the valve element can further include an extender section selectively secured to the barrel, the extender section having a third bore passing longitudinally therethrough. The third bore can be co-axial with the first and second bores. The apparatus can further comprise a cross link member wherein the extender section is secured between the barrel second end and the cross link member. If desired, a second pin can be located in the third bore. The extender and the second pin can define between them an annular passage. The annular passage communicates with the barrel bore. The pin can have a second end which is selectively securable between the extender second end and the cross link member such that the pin can be detached therefrom when the extender is detached from the cross link member.

The pin first end can be flat and, if desired, it can be even with the tip first end. The pin can also have a non-uniform diameter along its length such as, e.g., by employing a ribbed surface. The barrel bore preferably has a substantially constant diameter at an adjacent the barrel first end.

According to another aspect of the present invention, an easy-to-clean nozzle for injecting a viscous fluid and a non-viscous fluid is provided.

More particularly, in accordance with this aspect of the invention, the nozzle comprises a nozzle body having a discharge end and a flow passage for the viscous fluid extending to the discharge end. A shutoff barrel is disposed for reciprocating movement in the nozzle body flow passage to control the flow of the viscous fluid through the nozzle body discharge end. A bore extends in the shutoff barrel and terminates at a front end thereof. A pin is located in the shutoff barrel bore, the pin being removably mounted to the shutoff barrel. A non-viscous flow passage is defined between the pin and the barrel through which the non-viscous fluid selectively flows. The pin can be selectively removed from the barrel to allow a cleaning of the shut off barrel bore.

Preferably, the barrel comprises a rear section and a tip section which is threadedly received on the rear section. A first portion of the barrel bore extends longitudinally through the tip section and communicates with the second portion of the barrel bore which extends through the rear section. If desired, an extender section can be provided for the barrel with the extender section having a bore extending longitudinally therethrough. A cross link member can also be provided for the nozzle wherein the extender section is secured between the barrel second end and the cross link member. If desired, a second pin can be located in the extender section bore. The second pin and the extender define between them an annular passage which communicates with the barrel bore. The second pin can have a second end which is selectively securable between the extender second end and the cross link member such that the second pin can be removed from the extender when the extender is detached from the cross link member.

One advantage of the present invention is the provision of a new and improved fluid assisted injection molding nozzle which is inexpensive to manufacture.

Another advantage of the present invention is the provision of a fluid assisted injection molding nozzle which allows the flow of viscous fluid, such as a molten thermoplastic, into a mold cavity and the flow of a non-viscous fluid, such as a gas, into the mold cavity and allows a venting of the non-viscous fluid out of the mold cavity.

Still another advantage of the present invention is the provision of a fluid assisted injection molding nozzle which is not as prone to plugging as are the known nozzles of this type.

Yet another advantage of the present invention is the provision of a fluid assisted injection molding nozzle which, when it does plug, can be easily cleaned without having to disassemble the entire nozzle.

A further advantage of the present invention is the provision of a fluid assisted injection molding nozzle with a relatively short length pin which is considerably easier and less expensive to manufacture, use and clean than are the longer pins known to the art.

A still further advantage of the present invention is the provision of a fluid assisted injection molding nozzle with a relatively short length pin which has an enlarged diameter section that is adapted to be trapped between a barrel main portion and a tip thereof. In this way, the pin can be readily removed from the nozzle when the tip is detached from the barrel main portion.

A yet further advantage of the present invention is the provision of a fluid assisted injection molding nozzle which is segmented such that the appropriate length of nozzle can be provided. Such a construction is advantageous because it is easier and less expensive to manufacture several shorter barrel sections, having communicating bores extending therethrough, than one long barrel.

An additional advantage of the present invention is the provision of a fluid assisted injection molding nozzle which can be provided with a pair of spaced pin members, a first pin being located adjacent the tip of the barrel with a second pin being located adjacent the base of the barrel. The first pin allows for an annular flow of fluid out of the barrel and into the mold cavity. The second pin, adjacent the base, provides a means for preventing any molten thermoplastic, which may flow into the barrel bore during venting, from flowing out of that bore. The flow of molten thermoplastic out of the barrel bore is disadvantageous in that such molten thermoplastic may then also flow into the fluid valves or the fluid lines that are connected to the barrel bore, thereby leading to a lengthy and costly shutdown of the injection molding machine.

A further additional advantage of the present invention is the provision of a fluid assisted injection molding nozzle in which a relatively short pin is located in a barrel bore. The pin, which may have sections with different outer surfaces, provides both a means for assuring an annular flow of fluid at the tip of the barrel bore as well as a means for retarding a flow of molten thermoplastic past the pin down the barrel bore.

Still other benefits and advantages of the invention will become apparent to those skilled in the art upon a reading and understanding of the following detailed specification.

BRIEF DESCRIPTION OF THE DRAWINGS

The invention may take form in certain structures and parts, several embodiments of which will be described in detail in this specification and illustrated in the accompanying drawings. In the drawings:

FIG. 1 is an exploded side elevational view, partially in cross-section, of a barrel and pin arrangement for a fluid assisted injection molding nozzle according to one embodiment of the present invention;

FIG. 3 is an enlarged cross-sectional view of a portion of FIG. 2;

FIG. 4 is an enlarged perspective view of a pin of FIG. 3;

FIG. 5 is a perspective view of another embodiment of a pin according to the present invention;

FIG. 6 is a side elevational view, partially in cross-section, illustrating the use of the pin of FIG. 5 in a barrel according to the present invention;

FIG. 7 is an exploded side elevational view, partially in cross-section, illustrating another embodiment of a barrel and pin arrangement according to the present invention; and, FIG. 8 is a partial cross-sectional view of FIG. 3 along line 8—8.

DETAILED DESCRIPTION OF THE SEVERAL EMBODIMENTS

Figure 2:
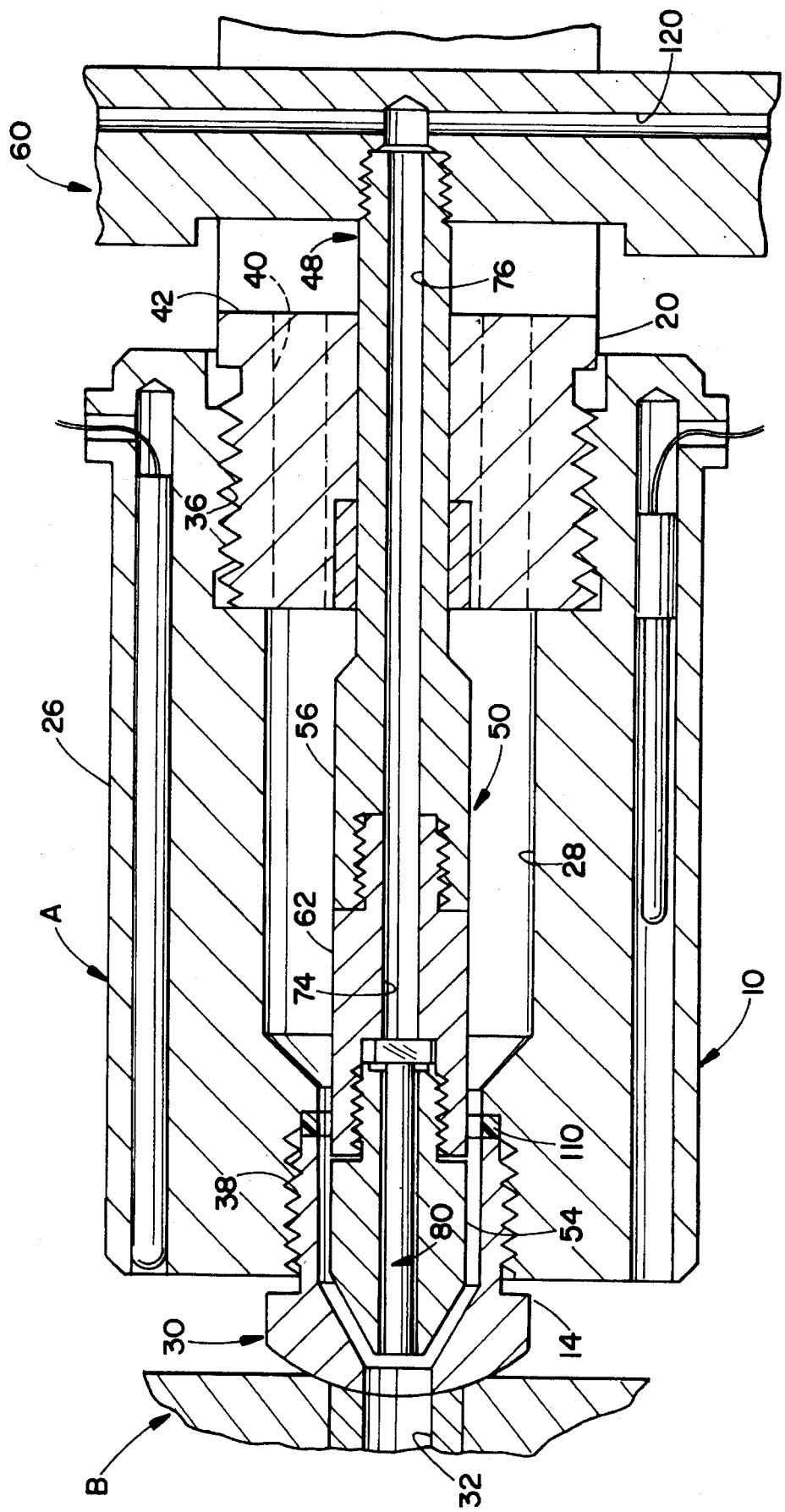
FIG. 2 is an enlarged cross-sectional view of a fluid assisted injection molding nozzle employing the barrel and pin arrangement of FIG. 1 together with a portion of an associated mold.

Referring now to the drawings, wherein the showings are for purposes of illustrating several embodiments of the invention only and not for purposes of limiting same, FIG. 2 shows a fluid assisted injection molding apparatus which includes the subject new nozzle A located adjacent a mold body B. While the nozzle is primarily designed for and will hereinafter be described in connection with an apparatus used for the gas assisted injection molding of molten thermoplastic materials, it should be appreciated that the nozzle could also be used in various other molding environments in which a relatively viscous fluid and a relatively non-viscous fluid (such as nitrogen gas, steam, water or the like) are injected, such as for the production of lost wax masters and the like.

With continuing reference to FIG. 2, the nozzle A comprises a nozzle body 10 which has a discharge end 14. The nozzle includes a housing having a central section 20 and a barrel housing 26, having a longitudinal bore 28 extending therethrough. Also provided is a tip 30 which similarly has a longitudinal bore 32 extending therethrough. The two bores 28 and 32 are preferably co-axial. Inter-engaging threads as at 36 secure the barrel housing 26 to the central section 20. Securing the tip 30 to the barrel housing 26 are suitable inter-engaging threads as at The central section 20 has a first aperture 40 extending longitudinally therethrough in an orientation which is coaxial with the bores 28 and 32 of the barrel housing and tip respectively. Preferably, two kidney-shaped apertures 40 are provided in the central section 20, as is known. This allows for the formation of a flow channel entirely through the nozzle A. A second aperture 42 extends through opposing side walls of the central section 20 in a direction normal to the first aperture 40 and not in communication therewith. A valve body 48 is adapted to reciprocate in the nozzle body 10. For this purpose, a spreader or barrel 50 of the valve body is reciprocatingly mounted in the bore 28 of the barrel housing 26.

With reference now to FIG. 1, the barrel 50 has a tapered first end as at 52 located on a front section or tip 54 thereof. The barrel also has a rear section 56 having on one end a threaded end portion as at 58. The end portion 58 allows the barrel 50 to be secured in a threaded bore 59 of a crossbar or crosslink member 60 which extends through the central section second aperture 42. Located between the tip 54 and the rear section 56 is an extender section 62 having on a first end thereof a threaded socket 64. This accommodates a threaded second end 66 of the tip 54. Located on a second end of the extender section 62 is a threaded portion 68 which cooperates with a threaded socket 70 provided on another end of the rear section 56. In this way, the tip 54, extender 62 and rear section 56 can be threadedly secured together as is evident from FIG. 2. Extending longitudinally through the tip 54 is a first bore 72. A second bore 74 extends longitudinally through the extender section 62. Finally, a third bore 76 extends longitudinally through the rear section 56. The three bores 72, 74 and 76 are preferably co-axial. However they can be off axis to each other as long as they communicate with each other so as to provide an uninterrupted flow path through the barrel 50. The barrel 50 can be lengthened simply by employing more extender sections 62, should that become necessary.

Extending through the first bore 72 of the tip 54 is a pin 80 which has an external diameter of suitable size so that the pin does not interfere with the bore 72 in the tip 54. In other words, an external diameter of the pin 80 is smaller than the diameter of the tip bore 72. With reference now also to FIG. 4, the pin 80 has a front end 82. As shown in FIG. 3, a front face 84 of the pin 80 is preferably located even with a front face 86 of the tip 54. However, the pin tip front face could also be somewhat ahead of or behind the barrel tip front face if desired.

With reference again to FIG. 4, the pin also includes an enlarged diameter section 88. In the embodiment of FIG. 4, the enlarged diameter section 88 is located at a rear end 90 of the pin 80. However, it is apparent from the embodiment of FIG. 5, that the enlarged diameter section does not need to be located at the rear end of the pin. As is evident from FIG. 3, the enlarged diameter section 88 is trapped between a skirt 92 extending rearwardly from the rear face of the barrel tip 54 and a shoulder 94 located adjacent the threaded socket 64 of the extender 62. Of course, if no extender is in use, the enlarged diameter section 88 could be trapped between the skirt 92 and a similar shoulder 96 of the rear section 56 adjacent the threaded socket 70 thereof.

A fluid flow passage 98 is defined between the pin 80 and the bore 72 of the barrel tip 54. A suitable non-viscous fluid such as a nitrogen gas or the like can flow through the passage 98. The fluid flow passage is annular or sleeve-like around the pin 80. Since the pin 80 is secured between the barrel tip 54 and the adjacent section of the barrel, whether it be the extender 62 or the rear portion 56, the pin reciprocates with the barrel 50. Thus, the pin front face 84 is always located substantially even with the front face 86 of the barrel tip. This relationship obviously depends on the dimensions chosen for the pin 80 and the tip 54. Preferably, the pin 80 is in the shape of a right cylinder which has a substantially constant diameter. It should be recognized, however, that other shapes for the pin are also possible.

With reference now to FIG. 8, it can be seen that the triangular shape of the enlarged diameter section 88 of the pin 80 enables fluid to flow through passages 102 defined between the skirt 92 of the tip 54 and the flat faces 104 of the enlarged diameter section 88. It should be appreciated, however, that other shapes could be employed for the enlarged diameter section than the triangular shape illustrated in FIGS. 4 and 8 just as long as there is enough room for fluid to flow around the enlarged diameter section.

It is believed that the front face 84 of the pin should be located approximately even with the front face 86 of the barrel in order to prevent molten thermoplastic from flowing back through the flow passage 98 during a venting of the gas from a gas cavity formed within the molten thermoplastic held in a mold cavity of the mold body B.

Depending on the length of the barrel 50, one or more spiders 110 may be provided in the bore 28 in order to support the barrel adjacent its front end. This is for the purpose of preventing the barrel front end from moving in a direction transverse to its reciprocating motion.

The third bore 76 extending through the rear section 56 of the barrel communicates with an aperture 120 which extends longitudinally in the crossbar 60 that is secured to the barrel 50. The aperture 120 can communicate, on at least one end of the crossbar with a suitable known fluid line (not illustrated).

In the embodiment thus far illustrated, it can be seen that should thermoplastic flow into the passage 98 defined between the pin 80 and the barrel tip bore 72, the tip can be readily detached from the extender section 62 simply by unthreading the tip from the extender. When this is done, the pin 80 can be easily removed from the barrel tip 54 in order to clean out the bore 72. At the same time, the bore 74 in the extender 62 can be cleaned in order to remove any thermoplastic which may have become deposited there.

Thereafter, the pin 80 can be reinserted into barrel tip 54 which, in turn, can be readily secured back onto the extender 62 thereby trapping the pin enlarged section 88 therebetween. Then, the nozzle can again be used. Therefore, maintenance is made considerably easier with the inventive pin and barrel combination as one can readily clean the nozzle without having to remove the entire barrel 50 from the crossbar 60. In addition, since the pin 80 is considerably shorter than the known pins it can be more easily and less expensively manufactured.

Through the use of one or more extenders 62, which can have the same length or different lengths, a suitable length of barrel 50 can be provided for any particular application. That is, the barrel 50 can be made in various lengths simply by adding or removing one or more extenders 62 located between the tip 54 and the rear section 56.

With reference now to FIGS. 5 and 6, another embodiment of a pin is there illustrated. For ease of comprehension and understanding of this embodiment, like components are identified by like numerals with a primed (') suffix and new components are identified by new numerals.

In this embodiment, a barrel tip 54' is secured to a barrel rear portion 56' since a threaded second end 66' of the tip is threaded into a threaded socket 70' of the rear portion. A longitudinal aperture 72' extending through the barrel tip is co-axial with a bore 76' extending through the rear section 56'.

With reference now to FIG. 5, adapted to be held between the barrel tip 54' and the rear section 56' is a pin 140. This pin includes a first cylindrical section 142 preferably having a smooth outer periphery and a front tip 144. An enlarged diameter section 146 is located approximately half-way along the length of the pin 140. Extending rearwardly from the enlarged diameter section 146 is a second section 148 which is provided with a threaded outer periphery 150. The first section 142 of the pin is a right cylinder whereas the second section 148 has a threaded outer periphery 150.

The enlarged diameter section 146 is so located along the length of the pin 140 that the pin first section 142 extends along the length of the barrel tip bore 72' whereas the pin second section 148 extends along a portion of the rear section bore 76'. The enlarged diameter section 146 is therefore suitably trapped between a skirt 92' of the barrel tip 54' and a shoulder 96' of the rear section 56'. In the embodiment illustrated in FIGS. 5 and 6, the diameters of the first and second sections 142 and 148 of the pin are substantially identical. However, it should be appreciated that the pin diameters could be different if the diameters of the bore 72' and 76' were suitably adjusted as well. For example, it may be advantageous to provide a relatively larger diameter pin second section 148 which would cooperate with a relatively larger diameter bore 76'. Alternatively, it may, under certain circumstances, be advantages to provide a relatively large diameter pin first section 142 accommodated in a relatively large diameter bore 72'.

This embodiment of the invention would be useful if it were desired to further restrict the flow of molten thermoplastic back through the aligned bores 72' and 76' as the molten thermoplastic would have difficulty in flowing past the threaded outer periphery 150 of the pin second section 148'.

With reference now to FIG. 7, yet another embodiment of the invention is there disclosed. In this embodiment, like components are identified by like numerals with a double primed suffix (") and new components are identified by new numerals.

In this embodiment, a barrel comprises a tip 54", a main section 160 and a rear section 162. Secured between the barrel tip 54" and the main section 160 is a first pin 80". Provided between a rear section 162 and a crossbar 60" is a second pin 164. To this end, an enlarged diameter section 166 of the second pin is trapped between a shoulder 168 of the crossbar and a skirt 170 of the rear section 162. The second pin 164 can be identical to the first pin 80" if desired. It should be recognized that the rear section 162 can be identical to the extender section 62 illustrated in connection with FIGS. 1–3. Thus, it would be feasible to employ a series of extenders should it be desired to lengthen the barrel.

The advantage of the design illustrated in FIG. 7 is that two different pins are employed in a spaced relationship from each other. The second pin 164 which is located adjacent the crossbar 60" will prevent a flow of molten thermoplastic therepast and into a fluid flow passage 120" of the crossbar 60". By the time the molten thermoplastic reaches that point of the barrel, it will have been cooled somewhat and so will be more easily solidified instead of flowing past the enlarged diameter section 166 of the second pin 164 and into the crossbar fluid flow passage 120".

The invention has been described with reference to several embodiments. Obviously, modifications and alterations will occur to others upon the reading and understanding of this specification. It is intended to include all such modifications and alterations insofar as they come within the scope of the appended claims or the equivalents thereof.

Having thus described the invention, it is claimed:

1. An apparatus for injecting a viscous fluid and a non-viscous fluid into a mold cavity of a mold body, comprising:
   a nozzle body comprising a discharge end and a flow passage for the viscous fluid extending to said discharge end;
   a valve element mounted for reciprocation in said nozzle body flow passage to control a flow of the viscous fluid through said nozzle body discharge end, said valve element comprising:
      a barrel having a first end and a second end, and a first bore extending longitudinally in said barrel,
      a tip detachably secured to said barrel first end, said tip engaging a portion of said nozzle body discharge end to prevent a flow of the viscous fluid therepast when said valve element is in one end position during reciprocation, said tip having a first end, a second end and a second bore extending longitudinally through said tip from said first end to said second end thereof, said first and second bores communicating with each other,
      a pin located in at least said second bore, said pin having a first end located adjacent said tip first end, such that said pin and said tip define between them an annular opening at said tip first end, wherein an annular flow passage is defined between said pin and said tip, said annular flow passage allowing a flow of the non-viscous fluid, said pin having an enlarged diameter section spaced from said pin first end, said enlarged diameter section being removably securable within a cavity defined between said tip and said barrel, said pin and said valve element defining a non-viscous fluid flow passage therebetween, wherein said pin can be removed from said tip when said tip is detached from said barrel.

2. The apparatus of claim 1 wherein said pin has a substantially cylindrical periphery extending from said pin first end to adjacent said enlarged diameter section.

3. The apparatus of claim 2 wherein said pin enlarged diameter section has a substantially triangular shape.

4. The apparatus of claim 1 wherein said valve element further comprises an extender section removably secured to said barrel second end, said extender section having a third bore extending longitudinally therethrough, said third bore being co-axial with said first and second bores and being in communication therewith.

5. The apparatus of claim 4 further comprising a cross link member wherein said extender section is secured between said barrel second end and said cross link member.

6. The apparatus of claim 5 further comprising a second pin located in said third bore, said extender section and said second pin defining between them an annular passage wherein said annular passage communicates with said barrel bore said second pin having a second end which is removably securable between said extender section and said cross link member such that said second pin can be removed from said extender section when said extender section is detached from said cross link member.

7. The apparatus of claim 1 wherein said pin first end is flat and wherein said pin first end is even with said tip first end.

8. The apparatus of claim 1 wherein said pin has a first section and a second section which are on opposite sides of said enlarged section, wherein said first and second sections have different geometries.

9. The apparatus of claim 1 wherein said pin has a non-uniform diameter section located along at least a portion of its length, said non-uniform diameter section being spaced from said enlarged section.

10. The apparatus of claim 9 wherein said pin non-uniform diameter section comprises a ribbed surface on said pin.

11. The apparatus of claim 1 wherein said barrel bore has a substantially constant diameter at and adjacent said barrel first end.

12. A nozzle for injecting a viscous fluid and a non-viscous fluid into a mold cavity of a mold body, said nozzle comprising:
   a nozzle body comprising a discharge end which communicates with said mold cavity and a flow passage for the viscous fluid extending to said discharge end;
   a valve element mounted for reciprocation in said nozzle body flow passage to control a flow of the viscous fluid through said nozzle body discharge end wherein said valve element comprises a multi-part barrel including at least a rear section and a detachable tip located at a first end of said rear section, said tip being adapted to engage a section of said nozzle body to prevent a flow of the viscous fluid therepast when said valve element is in one end position during reciprocation, and first and second bores extending longitudinally through said tip and rear section respectively, said first and second bores communicating with each other;

a pin located in at least said first bore, said pin including a first end and an enlarged section spaced from said first end, said enlarged section enabling said pin to be secured to said barrel within a cavity defined between said rear section and said tip such that said pin can be removed from said barrel when said tip is detached from said rear section; and, a flow passage defined between said pin and said barrel, said flow passage allowing a flow of a non-viscous fluid through said barrel and into the mold cavity.

13. The nozzle of claim 12 wherein said pin comprises a first substantially cylindrical portion within said first bore, and a second substantially cylindrical portion within said second bore.

14. The nozzle of claim 13 wherein said second substantially cylindrical portion comprises a baffle means for retarding a flow of the viscous fluid therepast.

15. An easy to clean nozzle for injecting a viscous fluid and a non-viscous fluid, comprising:

a nozzle body having a discharge end and a flow passage for the viscous fluid extending to said discharge end;

a shut off barrel disposed for reciprocating movement in said nozzle body flow passage to control a flow of the viscous fluid through said nozzle body discharge end by engaging said nozzle body when in an end position during reciprocation to prevent the flow of the viscous fluid therepast, said barrel including a rear section and a removable tip;

a bore extending in said shut off barrel and terminating at an end of said tip thereof;

a pin mounted in at least the portion of said shut off barrel bore within said tip, wherein said pin includes a first end and an enlarged section spaced from said first end, said enlarged section being located in a cavity defined between said rear section and said tip when said tip is secured to said rear section, said pin being removable from said barrel when said tip is removed; and, a non-viscous fluid flow passage defined between said pin and said barrel through which the non-viscous fluid selectively flows, wherein said pin can be selectively removed from said barrel to allow a cleaning of said shut off barrel bore.

16. The nozzle of claim 15 further comprising an extender section removably securable to an end of said barrel rear section, said extender section having a bore extending longitudinally therethrough, said extender section bore communicating with said barrel bore.

17. The nozzle of claim 16 further comprising a cross link member, wherein said extender section is secured between said barrel rear section and said cross link member.

18. The apparatus of claim 17 further comprising a second pin located in said extender section bore, said second pin and said extender section defining between them an annular passage, which communicates with said barrel bore, said second pin having a second end which is removably securable between said extender section and said cross link member such that said second pin can be removed from said extender section when said extender section is detached from said cross link member.

19. A gas assisted injection molding nozzle comprising:

a nozzle body having a flow passage for molten thermoplastic extending therein;

a valve element mounted for reciprocation in said nozzle body flow passage to control a flow of the molten thermoplastic by engaging said nozzle body when said valve element is in an end position during reciprocation to prevent the flow of the molten thermoplastic therepast, said valve element comprising:

a barrel, a tip detachably secured to an end of said barrel, a cavity defined between said tip and said barrel, a first gas flow passage extending through at least a portion of said barrel, and a second gas flow passage extending through said tip, wherein said second gas flow passage communicates with said first gas flow passage; and, a pin located in at least said second gas flow passage, said pin comprising a first section and an enlarged diameter section spaced therefrom, said enlarged diameter section being detachably securable in the cavity defined between said tip and said barrel to prevent longitudinal movement of said pin in relation to said barrel, said pin and said valve element defining a gas flow passage therebetween.

* * * * *